United States Patent
Gupta

(10) Patent No.: US 9,796,421 B1
(45) Date of Patent: Oct. 24, 2017

(54) AUTONOMOUS VEHICLE LATERAL CONTROL FOR PATH TRACKING AND STABILITY

(71) Applicant: GM GLOBAL TECHNOLOGY OPERATIONS LLC, Detroit, MI (US)

(72) Inventor: Pinaki Gupta, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 15/093,052

(22) Filed: Apr. 7, 2016

(51) Int. Cl.
*G05D 1/00* (2006.01)
*B62D 15/02* (2006.01)
*G05D 1/02* (2006.01)
*B60W 40/103* (2012.01)

(52) U.S. Cl.
CPC ......... *B62D 15/025* (2013.01); *B60W 40/103* (2013.01); *G05D 1/021* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 5,913,376 A * | 6/1999 | Takei | ................. | B60K 31/0058 180/168 |
| 7,689,393 B2 * | 3/2010 | Boyd | ...................... | B60T 8/885 703/8 |
| 8,775,006 B2 * | 7/2014 | Moshchuk | ............ | B60W 50/08 340/436 |
| 9,688,308 B2 * | 6/2017 | Lee | ...................... | B62D 15/025 |
| 2009/0276111 A1 * | 11/2009 | Wang | .................. | B60T 8/17551 701/23 |
| 2009/0319113 A1 * | 12/2009 | Lee | ...................... | B62D 15/025 701/25 |
| 2010/0082195 A1 * | 4/2010 | Lee | ...................... | B62D 15/025 701/25 |
| 2010/0106356 A1 * | 4/2010 | Trepagnier | ............ | G01S 17/023 701/25 |
| 2012/0283912 A1 * | 11/2012 | Lee | ........................ | B62D 1/286 701/41 |
| 2014/0052340 A1 * | 2/2014 | Bajpai | ...................... | B62D 6/00 701/42 |
| 2015/0134178 A1 * | 5/2015 | Minoiu-Enache | .. | B60W 50/035 701/23 |
| 2015/0158524 A1 * | 6/2015 | Lee | ...................... | B62D 15/025 701/41 |
| 2016/0288831 A1 * | 10/2016 | Lee | .......................... | B62D 6/00 |
| 2017/0168502 A1 * | 6/2017 | Gordon | ................ | G05D 1/0289 |

* cited by examiner

*Primary Examiner* — Tyler Paige
(74) *Attorney, Agent, or Firm* — Lorenz & Kopf, LLP

(57) ABSTRACT

Methods, systems, and vehicles are provided for facilitating control of steering in autonomous vehicles. In accordance with one embodiment, an autonomous vehicle includes one or more wheel sensors and a processor. The one or more sensors are configured to obtain sensor data pertaining to a side slip of the autonomous vehicle. A dual mandate of desired path tracking & stability is achieved by using a combination of two linear controllers. The first controlled facilitates tracking whereas the second controller facilitates vehicle stability. When the stability event occurs a gradual shift towards the second controller occurs and with recovery from stability event gradual shift towards the first controller. Mimicking of driver behavior by changing the desired trajectory and dynamic control gain adaptation are also added.

20 Claims, 5 Drawing Sheets

AUTONOMOUS VEHICLE LATERAL CONTROL FOR PATH TRACKING AND STABILITY

TECHNICAL FIELD

The present disclosure generally relates to vehicles, and more particularly relates to methods and systems for controlling steering for autonomous vehicles.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. However, it may be desirable to improve control of an autonomous vehicle, for example in controlling steering of an autonomous vehicle.

Accordingly, it is desirable to provide techniques for improved control of steering for autonomous vehicles. It is also desirable to provide methods, systems, and vehicles incorporating such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises determining, via information provided via a sensor, a side slip angle for an autonomous vehicle, and controlling, via a processor, steering for the autonomous vehicle using a selected control algorithm based at least in part on the side slip angle. The selected control algorithm is selected from a first control algorithm and a second control algorithm.

In accordance with another exemplary embodiment, a system is provided. The system comprises a sensor and a processor. The sensor is configured to obtain sensor data pertaining to a side slip angle for an autonomous vehicle. The processor is configured to at least facilitate controlling steering for the autonomous vehicle using a selected control algorithm based at least in part on the side slip angle, wherein the selected control algorithm is selected from a first control algorithm and a second control algorithm.

In accordance with a further exemplary embodiment, an autonomous vehicle is provided. The autonomous vehicle includes one or more sensors and a processor. The one or more sensors are configured to obtain sensor data pertaining to a side slip angle for the autonomous vehicle. The processor is configured to at least facilitate controlling steering for the autonomous vehicle using a selected control algorithm based at least in part on the side slip angle, wherein the selected control algorithm is selected from a first control algorithm and a second control algorithm.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
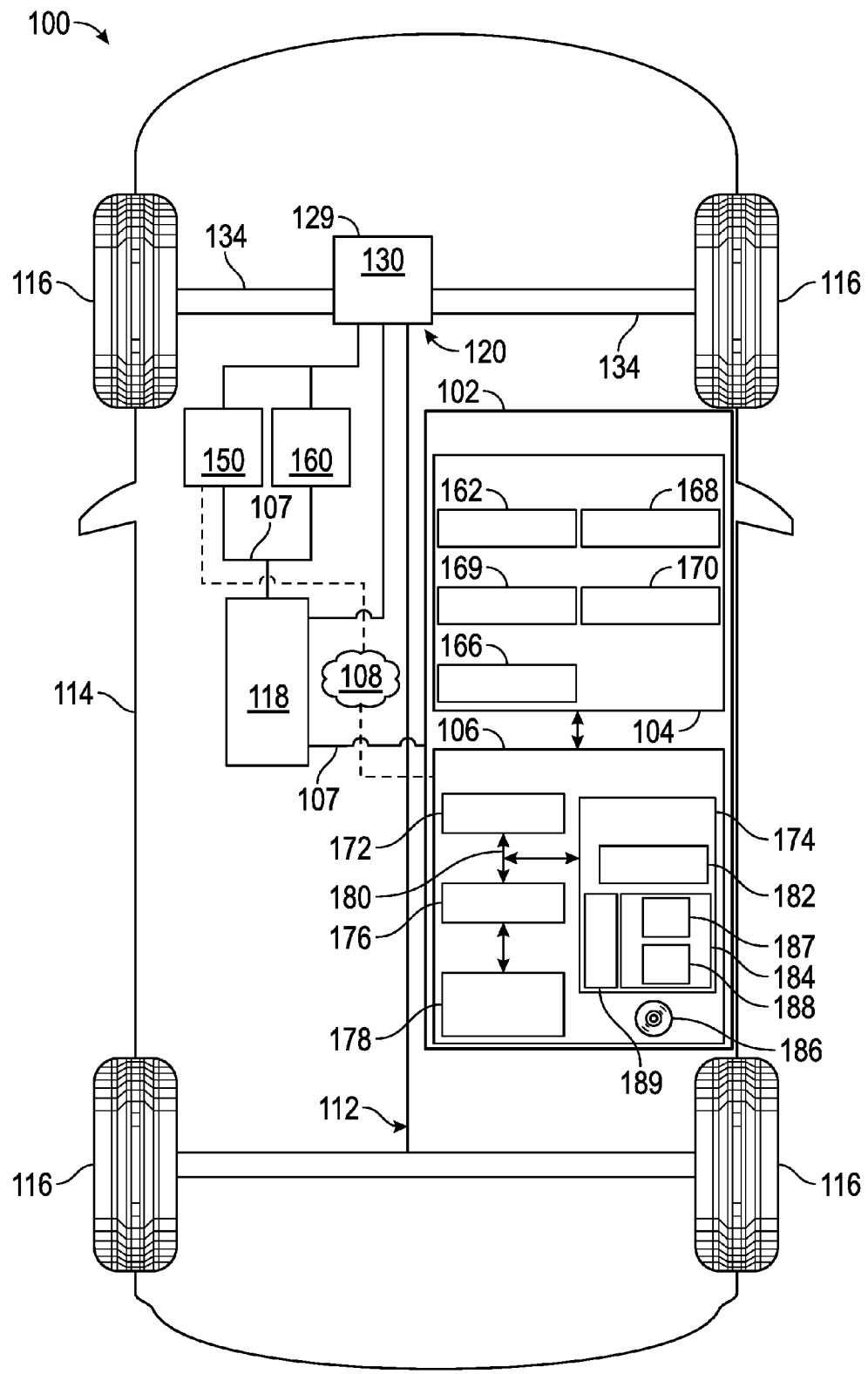
FIG. 1 is a functional block diagram of an autonomous vehicle, and that includes a control system for controlling steering using different control algorithms based at least in part on a side slip angle of the vehicle, in accordance with an exemplary embodiment.

FIG. 1 illustrates a vehicle 100, or automobile, according to an exemplary embodiment. The vehicle 100 is an autonomous vehicle. As described in greater detail below, the vehicle 100 includes a steering system 150 and a control system 102 for controlling steering of the vehicle 100 based at least on a side slip angle for the vehicle 100. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

In one embodiment depicted in FIG. 1, the vehicle 100 includes, in addition to the above-referenced control system 102 and steering system 150, a chassis 112, a body 114, four wheels 116, an electronic system (ECS) 118, a powertrain 129, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. As depicted in FIG. 1, each wheel 116 comprises a wheel assembly that includes a tire as well as a wheel and related components (and that are collectively referred to as the "wheel 116" for the purposes of this Application). In various embodiments the vehicle 100 may differ from that depicted in FIG. 1.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine. In various other embodiments, the engine 130 may comprise an electric motor and/or one or more other transmission system components (e.g. for an electric vehicle), instead of or in addition to the combustion engine.

Still referring to FIG. 1, in one embodiment, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In various embodiments, the vehicle 100 automatically controls steering of the vehicle 100 via instructions provided from the control system 102 to the steering system 150 based at least in part on a side slip angle for the vehicle 100, for example as described in greater detail further below.

The braking system 160 is mounted on the chassis 112, and provides braking for the vehicle 100. In various embodiments, the vehicle 100 automatically controls braking of the vehicle 100 via instructions provided from the control system 102 to the braking system 160.

In one embodiment, the control system 102 is mounted on the chassis 112. As noted above and discussed in greater detail below (as well as further below in connection with FIGS. 2-4), the control system 102 controls steering of the vehicle 100 via instructions that are provided to the steering system 150 based at least in part on a side slip angle for the vehicle 100, as well as various other parameters in various embodiments (including, by way of example, a desired path, yaw rate, lateral velocity, and a real time cost function, in certain embodiments).

As depicted in FIG. 1, in one embodiment the control system 102 comprises various sensors 104 (also referred to herein as a sensor array) and a controller 106. The sensors 104 include various sensors that provide measurements for use in controlling steering for the vehicle 100. In the depicted embodiment, the sensors 104 include one or more steering angle sensors 162, yaw sensors 164, wheel sensors 166, accelerometers 168, and navigation sensors 170.

The steering angle sensors 162 measure information pertaining to a steering angle of the vehicle 100. In certain embodiments, the steering angle sensors 162 are part of or coupled to the steering system 150. For example, various embodiments, the steering angle sensors 162 may be coupled to a steering wheel of the vehicle 100 (if the vehicle 100 has a steering wheel), a steering column of the vehicle 100, one or more axles or drive shafts of the vehicle 100, one or more wheels 116 of the vehicle 100, and/or one or more other locations of the vehicle 100.

The yaw sensors 164 measure information pertaining to one or more yaw values for the vehicle 100. In one embodiment, the yaw sensors 164 measure a yaw rate for the vehicle 100.

The wheel sensors 166 measure information pertaining to one or more wheels 116 of the vehicle 100. In one embodiment, the wheel sensors 166 comprise wheel speed sensors that are coupled to each of the wheels 116 of the vehicle 100. Also in one embodiment, the wheel sensors 166 provide wheel-related information (including individual wheel speeds of each of the different wheels 116) that are used to determine a side wheel slip for the vehicle 100 as well as a lateral velocity of the vehicle 100, among other values.

The one or more accelerometers 168 measure information pertaining to an acceleration of the vehicle 100. In various embodiments, the accelerometers 168 measure one or more acceleration values for the vehicle 100, including latitudinal and longitudinal acceleration.

The navigation sensors 170 obtain information pertaining to a position and movement of the vehicle 100. In one embodiment, the navigation sensors 170 track a position and movement of the vehicle 100 with respect to a desired path for the vehicle 100. The navigation sensors 170 may include, by way of example, front camera sensors, other camera sensors (e.g. additional camera sensors, e.g. on a rear of the vehicle, on a passenger's side of the vehicle, or on a driver's side of the vehicle, in addition to the cameras on the front of the vehicle), and/or various other possible sensors such as radar, lidar, sonar, machine vision, Hall Effect, and/or other sensors). In addition, in certain embodiments, the navigation sensors may also be used to ascertain one or more velocity and/or acceleration values for the vehicle 100. In one embodiment, the navigation sensors 170 are part of or coupled to a satellite-provided network, such as part of a global communication system (GPS) and/or GPS device.

The controller 106 is coupled to the sensors 104 and the steering system 150. The controller 106 utilizes information from the sensors 104 to determine a steering slip angle for the vehicle 100, among other parameter values (such as, by way of example, a desired path, yaw rate, and lateral velocity for the vehicle 100). The controller 106 utilizes the steering slip angle (and, in various embodiments, one or more of the other parameters) in providing instructions to the steering system 150 to automatically control steering for the vehicle 100. In certain embodiments, the instructions may be sent from the controller 106 to the steering system 150, either directly or indirectly via one or more other systems (e.g., the ECS 118) via one or more wired connections 107 onboard the vehicle (e.g. a vehicle CAN bus). In other embodiments, the instructions may be sent from the controller 106 to the steering system 150 via one or more wireless communication networks 108, such as via one or more Internet, satellite, cellular, and/or short range (e.g. BlueTooth) networks, systems, and/or devices.

As depicted in FIG. 1, the controller 106 comprises a computer system. In certain embodiments, the controller 106 may also include one or more of the sensors of the sensors 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the steering system 150 and/or the electronic system 118 of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 and multiple control algorithms 184 contained within the memory 174 and, as such, controls the general operation of the controller 106 and the computer system of the controller 106, generally in executing the processes described herein, such as those described further below in connection with FIGS. 2-4.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 and control algorithms 184. As depicted in FIG. 1, the control algorithms 184 include a first control algorithm 187 and a second control algorithm 188. Also in the depicted embodiment, the memory 174 stores gain scheduling function 189 that is used in providing relative weighting for the first control algorithm 187 versus the second control algorithm 188. The controller 106 controls steering using one or more selected algorithms of the first control algorithm 187 and the second algorithm 188 based at least in part on a side slip angle of the vehicle 100 and the gain scheduling function 189, such as in accordance with the processes described further below in connection with FIGS. 2-4.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensors 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps described further below in connection with FIGS. 2-4. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

It will be appreciated that the vehicle 100 can be operated in an automated manner by commands, instructions, and/or inputs that are "self-generated" onboard the vehicle itself. Alternatively or additionally, the vehicle 100 can be controlled by commands, instructions, and/or inputs that are generated by one or more components or systems external to the vehicle 100, including, without limitation: other autonomous vehicles; a backend server system; a control device or system located in the operating environment; or the like. In certain embodiments, therefore, the vehicle 100 can be controlled using vehicle-to-vehicle data communication, vehicle-to-infrastructure data communication, and/or infrastructure-to-vehicle communication, among other variations (including partial or complete control by the driver or other operator in certain modes, for example as discussed above).

Figure 2:
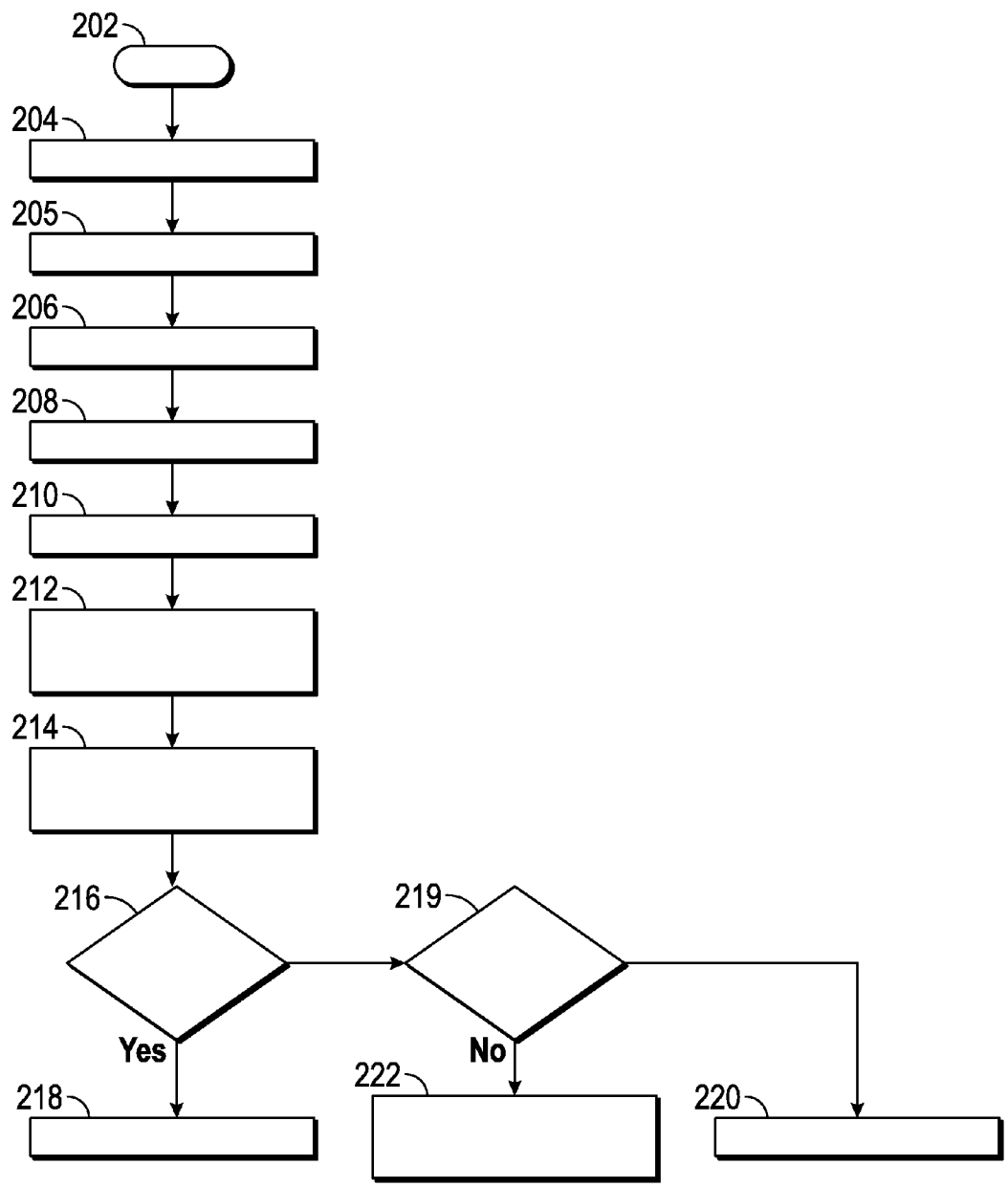
FIG. 2 is a flowchart of a process for controlling steering in an autonomous vehicle, and that can be used in connection with the system and vehicle of FIG. 1, in accordance with an exemplary embodiment.

With reference to FIG. 2, a flowchart is provided for a process 200 for controlling steering in an autonomous vehicle, in accordance with an exemplary embodiment. The process 200 may be implemented in connection with the vehicle 100 of FIG. 1, including the control system 102 and the steering system 100 thereof, in accordance with various embodiments.

As depicted in FIG. 2, the process 200 begins at step 202. In one embodiment, the process 200 begins when an autonomous vehicle is in operation, for example, when the vehicle is in a "drive mode", moving along a path or roadway, and/or ready for movement along a desired path.

Various data is obtained pertaining to the vehicle (step 204). In various embodiments, the data includes various information, measurements, and other data from the sensors 104 of FIG. 1, such as velocity position values, vehicle movement values, vehicle velocities and/or acceleration, a target path for the vehicle, and vehicle position, movement, and/or slip values. In various embodiments, as part of step 204, a yaw rate, lateral velocity, and side slip angle is obtained. In one embodiment, the yaw rate is measured by one or more yaw sensors 164 of FIG. 1 as part of the data of step 204. In another embodiment, raw measurements from the yaw sensors 164 from step 204 are utilized by the processor 172 of FIG. 1 in calculating the yaw rate. In certain embodiments, the lateral velocity is determined by the processor 172 of FIG. 1 using data from one or more sensors 104 of FIG. 1, such as one or more wheel speed sensors 166, accelerometers 168, and/or navigation sensors 170. In certain other embodiments, the lateral velocity may be measured or determined directly by one or more sensors of the sensors 104. In one embodiment, the side slip angle is determined by the processor 172 of FIG. 1 using data from the wheel sensors 166 of FIG. 1. One technique for determining the side slip angle is discussed in U.S. Pat. No. 8,234,090, entitled System for Estimating the Lateral Velocity of a Vehicle, the entirety of which is incorporated by reference herein.

A vehicle desired path is obtained (step 205). In one embodiment, the vehicle path comprises an intended route or other path for the vehicle to reach intended destination, for example as inputted by an occupant of the vehicle. In certain embodiments, the vehicle path is determined via the processor 172 of FIG. 1 in combination with the navigation sensors 170 of FIG. 1, and/or one or more associated units and/or systems (e.g. a navigation system, GPS system, or the like).

A primary controller steering angle is determined (step 212). In one embodiment, the processor 172 of FIG. 1 determines the primary controller steering angle using the first control algorithm 187 of FIG. 1 using certain of the inputs described above. As discussed further below, in one embodiment the primary controller uses some inputs that are also used by the secondary controller described below, and also some different inputs. In one embodiment, the primary controller steering angle uses the first control algorithm 187 as part of a lane centering feature, with a relatively high priority on lane centering. Also in one embodiment, the processor 172 utilizes the desired path of step 205, the yaw rate of step 206, and the lateral velocity of step 208 in determining the primary controller steering angle using the first control algorithm 187 of FIG. 1.

In one embodiment, an augmented bicycle model is used for tracking the desired path. Also in one embodiment, a linear quadratic regulator (LQR) optimal control is used for feedback control of the desired path tracking objective. However any other feedback controllers such as PID could have been used. In one example, the bicycle model is used in conjunction with the following equation:

$$\begin{bmatrix} \dot{y} \\ \dot{\varphi} \\ \ddot{y} \\ \dot{r} \end{bmatrix} = \begin{bmatrix} 0 & v_x & 1 & 0 \\ 0 & 0 & 0 & 1 \\ 0 & 0 & -\frac{C_{af}+C_{ar}}{mv_x} & \frac{bC_{ar}-aC_{af}}{mv_x}-v_x \\ 0 & 0 & \frac{bC_{ar}-aC_{af}}{Iv_x} & -\frac{a^2C_{af}+b^2C_{ar}}{Iv_x} \end{bmatrix} \begin{bmatrix} y \\ \varphi \\ \dot{y} \\ r \end{bmatrix} + \begin{bmatrix} 0 \\ 0 \\ \frac{C_{af}}{m} \\ \frac{C_{af}L_f}{I} \end{bmatrix} \delta_F$$

in which yaw is represented by "ω", longitudinal velocity of the vehicle is represented by "Vx", the front/rear tire cornering stiffness is represented by "$C_{af}, C_{ar}$", the front/rear tire slip angle is represented by "$\alpha_f, \alpha_r$", the front steering angle is represented by "$\delta_f$", the distance from the center of gravity (CG) to the rear and front axels are represented by "a" and "b", respectively, "I" represents the moment of inertia around the center of mass perpendicular to the plane where the vehicle is located, "m" represents the mass of the vehicle, and "y" represents the offset from the desired path.

Also in one embodiment, the feedback effort for the LQR controller is obtained by solving the Ricatti equation for minimizing the following optimization objective, $$J = \int_{k=0}^{N-1} x(k)^T Q_1 x(k) + u(k)^T R_1 u(k)$$

Where $$x = \begin{bmatrix} y \\ \varphi \\ \dot{y} \\ r \end{bmatrix}, u = \delta_F, Q_1 \ \& \ R_1$$

are time varying cost matrices associated with the first controller.

In addition, in one embodiment, an LQR (Linear Quadratic Regulator) method comprises a linear feedback control for the first controller which gives a controller u=−K x (in which "x" represents the state) for the linear system $\dot{x}$=Ax+BU, in which A & B are state matrices. In one embodiment, the gain K for the LQR control is calculated in by solving algebraic Ricatti Equation, and the feedback controller for the first controller is represented using the following equation:

$$\delta_{FB,1} = -K_{LQR,1} \begin{bmatrix} y \\ \varphi \\ \dot{y} \\ r \end{bmatrix}$$

However, it will be appreciated that in various embodiments any number of feedback controllers may be utilized, instead of or in additional to an LQR linear controller. In certain embodiments, the feedback controller can be generalized in accordance with the following equation:

$$\delta_{FB,1} = -K_{Feedback\ Control,1} \begin{bmatrix} y \\ \varphi \\ \dot{y} \\ r \end{bmatrix}$$

In addition, in one embodiment, a feedforward control is obtained for the controller 1, using the following under-steer gradient equation.

$$\delta_{FF,1} = L\rho_{Dsrd} + K_{us}v_x^2 \rho_{Dsrd}$$

where $\rho_{Dsrd}$ is the desired trajectory curvature, Vx is the longitudinal velocity of the vehicle, L is the length of the vehicle, $K_{us}$ is the under-steer coefficient.

Also in one embodiment, the final controller 1 effort (i.e., for the first controller) is obtained by combining the feedforward and feedback efforts using the following equation:

$$\delta_{F,1} = \delta_{FB,1} + \delta_{FF,1}$$

A secondary controller steering angle is determined (step 214). As noted above, in one embodiment, the secondary controller uses some inputs that are also used by the primary controller described above, and also some different inputs. In one embodiment, the processor 172 of FIG. 1 determines the secondary controller steering angle using the second control algorithm 188 of FIG. 1. In one embodiment, the secondary controller steering angle uses the second control algorithm 188 as part of a vehicle stability feature, with a relatively high priority on compensating for side slip of the vehicle. Also in one embodiment, the processor 172 uses the desired path of step 205 and the yaw rate of step 206 in determining the secondary controller steering angle using the second control algorithm 188 of FIG. 1.

In one embodiment, the secondary controller uses a different representation of the bicycle model, in accordance with the following equation:

$$\begin{bmatrix} \dot{y} \\ \dot{\varphi} \\ \dot{\beta} \\ \dot{r} \end{bmatrix} = \begin{bmatrix} 0 & v_x & v_x & 0 \\ 0 & 0 & 0 & 1 \\ 0 & 0 & -\frac{C_{af}+C_{ar}}{mv_x} & \frac{bC_{ar}-aC_{af}}{mv_x^2}-1 \\ 0 & 0 & \frac{bC_{ar}-aC_{af}}{Iv_x} & -\frac{a^2C_{af}+b^2C_{ar}}{Iv_x} \end{bmatrix} \begin{bmatrix} y \\ \varphi \\ \beta \\ r \end{bmatrix} + \begin{bmatrix} 0 \\ 0 \\ \frac{C_{af}}{m} \\ C_{af}L_f/I \end{bmatrix} \delta_F$$

In this equation, the lateral velocity state is replaced by the sideslip state (β) (as compared with the bicycle model equation used by the primary controller). The remaining state definitions remain as described above for the primary controller.

In one embodiment, the feedback effort for the LQR controller is obtained by solving the Ricatti equation for minimizing the following optimization objective, $$J = \sum_{k=0}^{N-1} x(k)^T Q_2 x(k) + u(k)^T R_2 u(k)$$

Where $$x = \begin{bmatrix} y \\ \varphi \\ \beta \\ r \end{bmatrix}, u = \delta_F, Q_2 \& R_2$$

are time varying cost matrices associated with the second controller.

In addition, in one embodiment, an LQR method for the second controller comprises a linear feedback control which gives a controller $u=-K\ x$ (in which "x" represents the state) for the linear system $\bar{x}=Ax+Bu$, in which A & B are state matrices. In one embodiment, the gain K for the LQR control for the second controller is calculated in by solving algebraic Ricatti Equation, and the feedback controller for the second controller is represented using the following equation:

$$\delta_{FB,2} = -K_{LQR,2} \begin{bmatrix} y \\ \varphi \\ \beta \\ r \end{bmatrix}$$

Similar to the discussion above with respect to the first controller, in one embodiment a linear feedback controller $u=-K\ x$, was chosen wherein K was calculated using the LQR method. However, also similar to the discussion above, it will be appreciated that in various embodiments any number of feedback controllers may be utilized, instead of or in additional to an LQR linear controller, for the second controller.

In one embodiment, the final controller 2 effort (i.e., for the second controller) is obtained by only using the feedback effort, in accordance with the following equation:

$$\delta_{F,2} = \delta_{FB,2}$$

In one embodiment, the first control algorithm 187 used in step 212 has a relatively higher priority for lane centering, as compared with the second control algorithm 188. Also in one embodiment, the second control algorithm 188 has a relatively higher priority for vehicle stability, as compared with the first control algorithm 187. In addition, in one embodiment, the first control algorithm 187 provides relatively more active steering as compared with the second control algorithm 188

A determination is made as to whether a side slip angle for the vehicle is less than a first predetermined threshold (k1) (step 216). In one embodiment, this determination is made by the processor 172 of FIG. 1 based on the results of step 210. In various embodiments, the side slip angle comprises a side slip angle for one or more of the wheels 116 of the vehicle 100 of FIG. 1. In one embodiment, the side slip angle is an average slip angle for each of the wheels 116 of the vehicle 100. However, this may vary in other embodiments.

In one embodiment, the sideslip angle threshold at which the beta control starts is determined a function of Feed forward steering RWA calculation. The feed forward term again depends on the desired trajectory curvature.

$$\delta_{FF} = L\rho_{Dsrd} + K_{us} v_x^2 \rho_{Dsrd}$$

Figure 5:
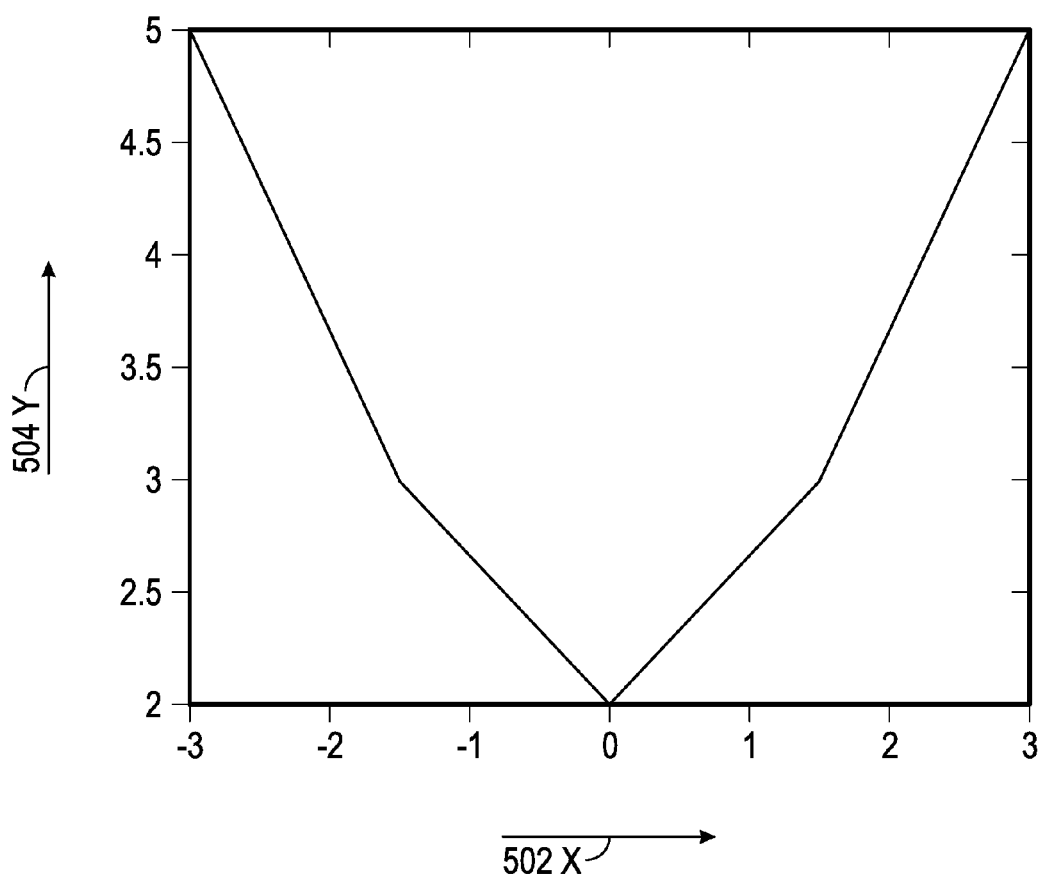
FIG. 5 is a chart showing an exemplary sideslip threshold calibration, that can be used in connection with the processes of FIGS. 2-4, in accordance with an exemplary embodiment.

Also in one embodiment, the sideslip angle threshold is obtained as a calibration table $K_\beta^{thresh}$ ($\delta_{FF,1}$). One such example is shown in FIG. 5, in which the x-axis (502) represents feed forward steering RWA, and the y-axis (504) represents a sideslip threshold for Beta control to be active.

If it is determined in step 216 that the slide slip angle is less than the first predetermined threshold (k1), then the primary control steering angle of step 212 is utilized (step 218). In one embodiment, the primary control steering angle of step 212 is utilized via the processor 172 of FIG. 1 in providing instructions to the steering system 150 of FIG. 1 in accordance with the first control algorithm 187 of FIG. 1. In one embodiment, the first control algorithm 187 is used exclusively during step 218, without the second control algorithm 188. In other embodiments, this may vary. For example, in one embodiment in which the side slip angle was previously greater than or equal to the predetermined threshold but is now less than the predetermined threshold, the first control algorithm 187 and the second control algorithm 188 are used together for a predetermined amount of time after the side slip angle became less than the predetermined threshold (e.g. phasing out the second control algorithm 188 while phasing in the first control algorithm 187, in one embodiment), after which the first control algorithm 187 is used exclusively provided that the side slip angle remains less than the predetermined threshold. In one embodiment, the gain scheduling function 189 of FIG. 1 is utilized during the transition period, for example in providing relative weighting for the first control algorithm 187 versus the second control algorithm 188. In one embodiment, the process proceeds to step 224, discussed further below.

In one embodiment, the output-gain scheduled controller effort is obtained by combining the primary and secondary controller efforts in accordance with the following equation:

$$\delta_F = (1 - \gamma_{gain,sched}) \delta_{F,2} + \gamma_{gain,sched} \delta_{F,1}$$

Where $\gamma_{gain,sched}$ is a normalized gain scheduled function. For the current embodiment it was chosen as $$\gamma_{gain,sched} = e^{-K_1 MAX(0, \beta - K_\beta^{thresh}(\delta_{FF,1}))}$$

Where $K_1$ is a calibration parameter. However, in various embodiments, the choice of the normalized gain schedule function is not limited to the aforementioned formulation.

With reference back to step 216, if it is instead determined that the side slip angle is greater than or equal to the first predetermined threshold (k1), then a determination is made as to whether the side slip angle for the vehicle is greater than a second predetermined threshold (k2) (step 219). In one embodiment, the second predetermined threshold (k2) is greater than the first predetermined threshold (k1). Also in one embodiment, this determination is made by the processor 172 of FIG. 1 based on the results of step 210.

If it is determined in step 219 that the side slip angle is greater than the second predetermined threshold (k2), then the control via the first controller is phased out (step 220). Specifically, in one embodiment, during step 220, the normalized gain scheduled function described above is utilized to effectively interpolate and transition away from the first controller. Also in one embodiment this is implemented via the processor 172 of FIG. 1. In one embodiment, the process proceeds to step 224, described further below.

Conversely, if it is determined in step 219 that the side slip angle is less than or equal to the second predetermined threshold (k2), then the first controller and the second controller are combined in accordance with a gain scheduling function $\gamma_{gain,sched}$ (step 222). In one embodiment, this is performed via the processor 172 of FIG. 1 in implementing the first control algorithm 187 and the second control algorithm 188 of FIG. 1 using the gain scheduling function 189 stored in the memory 174 of FIG. 1.

In one embodiment, during step 222, an actual cost is determined for the vehicle drive based on the use of the primary and/or secondary controllers, and the actual cost is used (as a combination of the primary and secondary controllers) along with the gain scheduling function 189 of FIG. 1 for steering control. Also in one embodiment, the gain scheduling function $\gamma_{gain,sched}$ is updated based on the actual cost for use in connection with the gain scheduling function. Also in one embodiment, during step 222, the individual efforts of the primary and secondary controllers (of steps 212 and step 214, respectively) are combined together according to the gain schedule function in accordance with the following equation:

$$\delta_F = (1-\gamma_{gain,sched})\delta_{F,2} + \gamma_{gain,sched}\delta_{F,1}$$

In one embodiment, the gain scheduling function is characterized by the following equation:

$$\gamma_{gain,sched} = e^{-K_1 MAX(0,\beta-K_\beta^{thresh}(\delta_{FF,1}))}$$

Where, $\delta_{FF,1} = L\rho_{Dsrd} + K_{us}v_x^2\rho_{Dsrd}$

Accordingly, in one such embodiment, the parameters for the gain scheduling function comprise $\beta$, $v_x$ and $\rho_{Dsrd}$. In one embodiment, the latter two parameters $v_x$ and $\rho_{Dsrd}$ are indirect parameters that affect through the calibration parameter $K_\beta^{thresh}$ (e.g. as depicted in FIG. 5). Accordingly, in one embodiment, a predominant correlation of $\gamma_{gain,sched}$ is with $\beta$. Thus, in one embodiment, when $\beta$ increases $\gamma_{gain,sched}$ decreases and vice versa.

Thus, in one embodiment, for a sufficiently large side slip angle (e.g. that is greater than the second predetermined threshold k2), then the scheduled gain can be assumed to be approximately equal to zero, i.e. $\gamma_{gain,sched} \approx 0$. A calibration threshold $K_0$ can be chosen such that when $\gamma_{gain,sched} < K_0$ where $K_0 \approx 0$,
Then we can approximate the gain scheduled control effort as, $$\delta_F = (1-\gamma_{gain,sched})\delta_{F,2} = \delta_{F,2} \text{ as } \gamma_{gain,sched} \approx 0$$

Thus in one embodiment, the process can essentially ignore the $2^{nd}$ controller when sideslip angle is too large, combine the $1^{st}$ and $2^{nd}$ controller via the gain scheduled method for a moderate slip angle and again ignore the $1^{st}$ controller for large side slip angles to obtain the final control effort (e.g. in step 220, discussed above).

Accordingly, in one embodiment, the process 200 satisfies a dual mandate of (i) tracking of a desired path; and (ii) stability. Then in one embodiment, the primary controller provides the core tracking features, whereas the secondary controller helps to keep the vehicle in the linear operating range by minimizing the side slip (which is a component of stability control). By using a gain scheduled approach, the combination of these controllers provides for a control algorithm which primarily maintains the tracking objective, but also gives us stability when we need it most. In addition, in one embodiment, when the secondary controller is invoked, the secondary controller attempts to influence one or more desired trajectory calculation algorithms by making it more benign, similarly to what a driver in the loop would do. When the stability event goes away and the process reverts back to the primary controller, the primary controller is made benign for a period of time (through the transition back).

Figure 3:
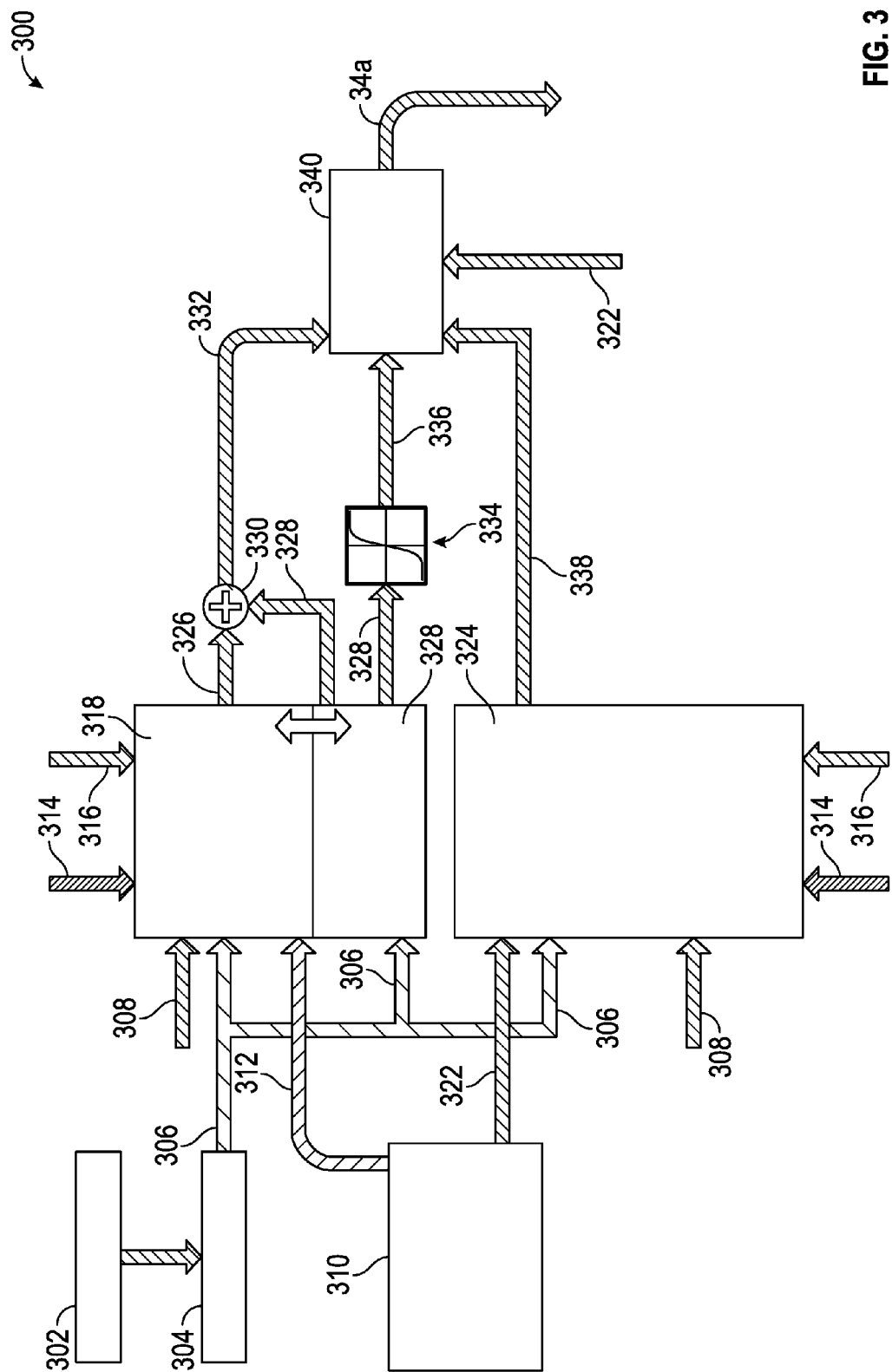
FIGS. 3 and 4 are flow diagrams of conceptual frameworks for the process of FIG. 2.

FIG. 3 is a flow diagram of a first conceptual framework 300 for the process 200 of FIG. 2, in accordance with an exemplary embodiment. As depicted in FIG. 3, fusion 302 is utilized with respect to different types of sensor information (e.g., camera, GPS, radar) to obtain a description of the surroundings for the vehicle, including the lane markings and/or other characteristics of the roadway and surrounding environment for the vehicle. In addition, path planning 304 is utilized to plan a trajectory to meet whatever the objective is using the sensor fusion provided data (e.g., for lane centering and/or lane changing). In one embodiment, data from the navigation sensors 170 of FIG. 1 (and/or associated systems) (e.g. from step 204 of FIG. 2) is used to determine the desired path (e.g. corresponding to step 205 of FIG. 2).

The desired path 306, along with a yaw rate 308, are provided for a primary path controller 318 (e.g. corresponding to the first control algorithm 187 of FIG. 1). In addition, a non-linear bicycle model observer/estimator 310 is used to generate lateral velocity 312 that is also provided to the primary path controller 318. The primary path controller 318 also receives inputs from a real time cost function 316 and real time state apace matrices 316. Also, a feedforward path tracking controller 320 receives inputs from the primary path controller 318, and also sends inputs to the primary path controller 318.

In addition, a secondary controller 324 (e.g. corresponding to the second control algorithm 188 of FIG. 1) receives information as to a side slip angle 322 of the vehicle (as generated via the non-linear bicycle model observer/estimator 310), along with information as to the desired path 306 and the yaw rate 308, as well as the real time cost function 314 and real time state space matrices 316.

In addition, the path tracking controller 320 also generates additional inputs 328 (e.g. as to operational conditions for the vehicle) which is used at 334 to determine a maximum allowable side slip angle 336 based on the particular inputs 328 (e.g. operation conditions). Moreover, the secondary controller 338 generates the secondary controller steering angle 338 (i.e. corresponding to the secondary controller steering angle of step 214 of FIG. 2. The primary controller angle 332, the maximum allowable side slip 336, and the secondary controller steering angle 338, as well as the side slip angle 322, are each provide to the gain scheduling function 340, which then generates a gain scheduled steering angle 342 for controlling steering of the vehicle.

Figure 4:
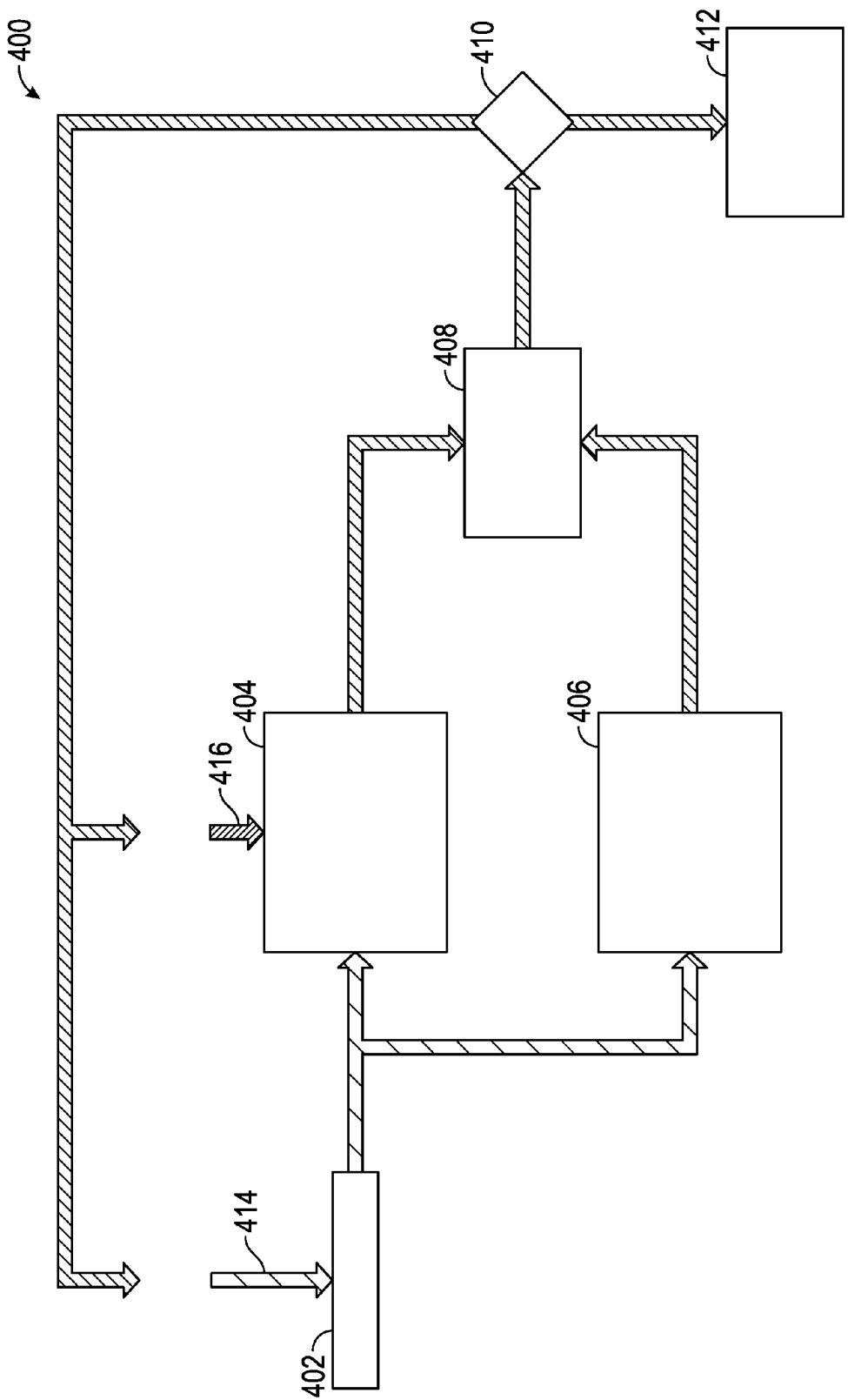

FIG. 4 is a flow diagram of a second conceptual framework 400 for the process 200 of FIG. 2, in accordance with an exemplary embodiment. As depicted in FIG. 4, path planning 402 (e.g. including a desired destination and a desired route or other path for the vehicle) is provided to a primary controller 404 and a secondary controller 406. Respective steering angles 405, 407 from the primary and secondary controllers 404, 406 are provided to a gain scheduling function 408. A determination 410 is made as to whether the secondary controller 406 has recently been active. If the secondary controller has not recently been active, then no steering change is made (step 412). Conversely, if the secondary controller has recently been active, then a more benign desired path is chosen using additional inputs 414 for the path planning 402 (for use by both the primary and secondary controllers 404, 406), and an increase in the actuator cost for a real-time cost function is also provided as additional inputs 416 for the primary controller 404.

In the LQR framework this means increasing the cost $R_1$ when a stability event occurs, using the following equation:

$$J=\int_{k=0}^{N-1} x(k)^T Q_1 x(k) + u(k)^T R_1 u(k)$$

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. It will similarly be appreciated that the displays 200, 202 may differ from that depicted in FIG. 2. In addition, it will be appreciated that conceptual framework 300 and process 400 may differ from those depicted in FIGS. 3 and 4, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   obtaining information pertaining to a side slip angle for an autonomous vehicle; and
   controlling, via a processor, steering for the autonomous vehicle using a selected control algorithm based at least in part on the side slip angle, wherein the selected control algorithm is selected from a first control algorithm and a second control algorithm.

2. The method of claim 1, wherein the step of controlling the steering for the autonomous vehicle comprises:
   controlling the steering using the first control algorithm, if the side slip angle is less than a first predetermined threshold; and
   controlling the steering using the second control algorithm, if the side slip angle is greater than a second predetermined threshold.

3. The method of claim 1, wherein the step of controlling the steering for the autonomous vehicle comprises:
   transitioning from controlling the steering using the first control algorithm to controlling the steering using the second control algorithm, if the side slip angle was previously less than the first predetermined threshold and is now greater than the first predetermined threshold.

4. The method of claim 1, wherein:
   if the side slip angle is greater than a first predetermined threshold within a predetermined time window, then a more begin desired path is calculated in addition to using the first control algorithm.

5. The method of claim 1, wherein the step of controlling the steering for the autonomous vehicle comprises:
   transitioning from controlling the steering using the second control algorithm to controlling the steering using the first control algorithm, if the side slip angle was previously greater than the first predetermined threshold and is now less than the first predetermined threshold.

6. The method of claim 5, wherein:
   the first control algorithm and the second control algorithm are both used, simultaneously, to control the steering the slide slip angle is less than the first predetermined threshold during the transitioning; and
   the first control algorithm is utilized without the second control algorithm to control steering after the slide slip angle has been less than the first predetermined threshold.

7. The method of claim 1, wherein the first control algorithm provides relatively more active steering as compared with the second control algorithm.

8. The method of claim 1, wherein:
   the first control algorithm has a relatively higher priority for lane centering, as compared with the second control algorithm; and
   the second control algorithm has a relatively higher priority for vehicle stability, as compared with the first control algorithm.

9. The method of claim 1, wherein:
   the selection of the control algorithm is based at least in part on the side slip angle in combination with a gain scheduling function that incorporates a real time cost function based at least in part on the side slip angle.

10. A system comprising:
    a sensor configured to obtain sensor data pertaining to a side slip angle for an autonomous vehicle; and
    a processor configured to at least facilitate controlling steering for the autonomous vehicle using a selected control algorithm based at least in part on the side slip angle, wherein the selected control algorithm is selected from a first control algorithm and a second control algorithm.

11. The system of claim 10, wherein the processor is further configured to at least facilitate:
    controlling the steering using the first control algorithm, if the side slip angle is less than a first predetermined threshold; and
    controlling the steering using the second control algorithm, if the side slip angle is greater than a second predetermined threshold.

12. The system of claim 10, wherein the processor is further configured to at least facilitate:
    transitioning from controlling the steering using the first control algorithm to controlling the steering using the second control algorithm, if the side slip angle was previously less than the first predetermined threshold and is now greater than the second predetermined threshold.

13. The system of claim 12, wherein the processor is further configured to at least facilitate:
    using the first control algorithm and the second control algorithm, simultaneously, to control the steering for a predetermined amount of time after which the slide slip angle is greater than the second predetermined threshold during the transitioning; and
    using the second control algorithm without the first control algorithm to control steering after the slide slip angle has been greater than the second predetermined threshold.

14. The system of claim 10, wherein the processor is further configured to at least facilitate:
    transitioning from controlling the steering using the second control algorithm to controlling the steering using the first control algorithm, if the side slip angle was previously greater than the first predetermined threshold and is now less than the first predetermined threshold.

15. The system of claim 14, wherein the processor is further configured to at least facilitate:
using the first control algorithm and the second control algorithm, simultaneously, to control the steering for a predetermined amount of time after which the slide slip angle is less than the predetermined threshold during the transitioning; and
using the first control algorithm without the second control algorithm to control steering after the slide slip angle has been less than the predetermined threshold.

16. The system of claim 10, wherein the first control algorithm provides relatively more active steering as compared with the second control algorithm.

17. The system of claim 10, wherein:
the first control algorithm has a relatively higher priority for lane centering, as compared with the second control algorithm; and
the second control algorithm has a relatively higher priority for vehicle stability, as compared with the first control algorithm.

18. The system of claim 10, wherein:
if the side slip angle is greater than a first predetermined threshold within a predetermined time window, then a more begin desired path is calculated by the processor in addition to using the first control algorithm.

19. An autonomous vehicle comprising:
one or more sensors configured to obtain sensor data pertaining to a side slip angle for the autonomous vehicle; and
a processor configured to at least facilitate controlling steering for the autonomous vehicle using a selected control algorithm based at least in part on the side slip angle, wherein the selected control algorithm is selected from a first control algorithm and a second control algorithm.

20. The autonomous vehicle of claim 19, wherein the processor is further configured to at least facilitate:
controlling the steering using the first control algorithm, if the side slip angle is less than a first predetermined threshold; and
controlling the steering using the second control algorithm, if the side slip angle is greater than a second predetermined threshold.

* * * * *